(12) United States Patent
Dixon

(10) Patent No.: US 11,370,248 B1
(45) Date of Patent: Jun. 28, 2022

(54) WHEEL ASSEMBLY

(71) Applicant: Desmond D'Keith Dixon, DeSoto, TX (US)

(72) Inventor: Desmond D'Keith Dixon, DeSoto, TX (US)

( * ) Notice: Subject to any disclaimer, the term of this patent is extended or adjusted under 35 U.S.C. 154(b) by 241 days.

(21) Appl. No.: 16/600,745

(22) Filed: Oct. 14, 2019

(51) Int. Cl.
*B60B 7/20* (2006.01)
*G09F 21/04* (2006.01)

(52) U.S. Cl.
CPC .............. *B60B 7/20* (2013.01); *G09F 21/045* (2013.01)

(58) Field of Classification Search
CPC ............ B60B 7/20; B60B 7/00; G09F 21/045
See application file for complete search history.

(56) References Cited

U.S. PATENT DOCUMENTS

| | | | |
|---|---|---|---|
| 7,407,033 B2* | 8/2008 | Wilson | B60B 7/20 180/371 |
| 7,524,093 B2* | 4/2009 | Sinnette | B60R 13/00 301/37.25 |
| 10,417,941 B1* | 9/2019 | Green | B60B 7/068 |
| 2005/0121968 A1* | 6/2005 | McCaster | B60B 7/20 301/37.25 |
| 2008/0055287 A1* | 3/2008 | Ishikawa | H04N 9/3185 345/204 |
| 2009/0015057 A1* | 1/2009 | Groomes | B60Q 1/326 301/37.108 |
| 2014/0267458 A1* | 9/2014 | Fisher | B60B 7/0033 345/690 |

* cited by examiner

*Primary Examiner* — Jason R Bellinger
(74) *Attorney, Agent, or Firm* — Plager Schack LLP; Mark H. Plager; Michael J. O'Brien

(57) ABSTRACT

A wheel assembly is configured to display graphic designs and digital information. The wheel assembly has a wheel, joined to a spinner hub with a spinner base. A weight is joined to a spinner base lower portion. A spacer is joined to the spinner base above the weight. A bracket is joined to the spinner base and arranged against the spacer. A mobile device is housed within the bracket. A cover plate is joined to the spinner base, and further comprises a central opening with graphic designs that surrounds the bracket. As the wheel rotates, the weight causes the spinner base rotate opposite the wheel thus maintaining the mobile device in a stable position so that the mobile device displays the digital information.

5 Claims, 4 Drawing Sheets

WHEEL ASSEMBLY

BACKGROUND

The embodiments herein relate generally to automotive vehicles and accessories.

SUMMARY

A wheel assembly is configured to display graphic designs and digital information. The wheel assembly has a wheel, joined to a spinner hub with a spinner base. A weight is joined to a spinner base lower portion. A spacer is joined to the spinner base above the weight. A bracket is joined to the spinner base and arranged against the spacer. A mobile device is housed within the bracket. A cover plate is joined to the spinner base, and further comprises a central opening that surrounds the bracket. As the wheel rotates, the weight causes the spinner base rotate opposite the wheel thus maintaining the mobile device in a stable position so that the mobile device displays the digital information.

In some embodiments, the spinner hub is fixed to the wheel with at least five hub screws. In some embodiments, the spinner hub is partially covered with a sleeve immediately adjacent to the spinner base such that the sleeve rotates independently of the spinner hub. In some embodiments, a pair of screws join the cover plate and the bracket to the spinner base.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
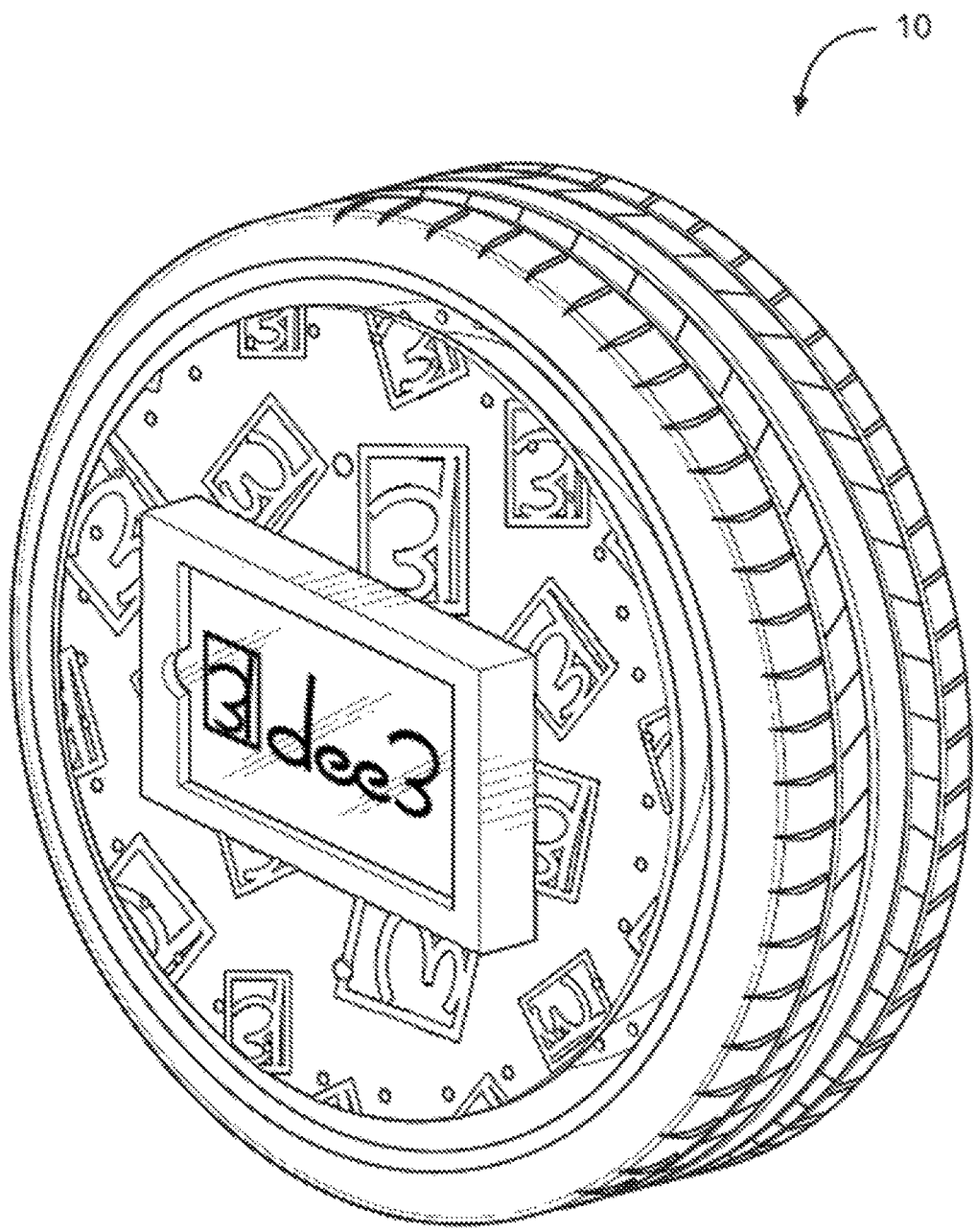
FIG. 1 shows a perspective view of one embodiment of the present invention.
Figure 2:
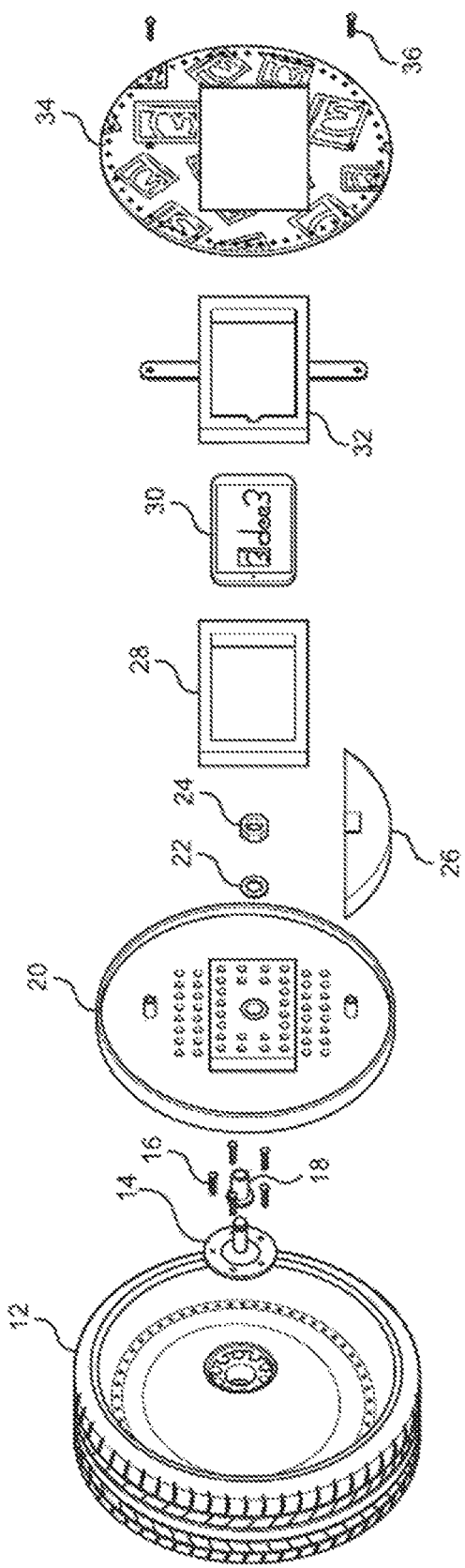
FIG. 2 shows an exploded view of one embodiment of the present invention.
Figure 3B:
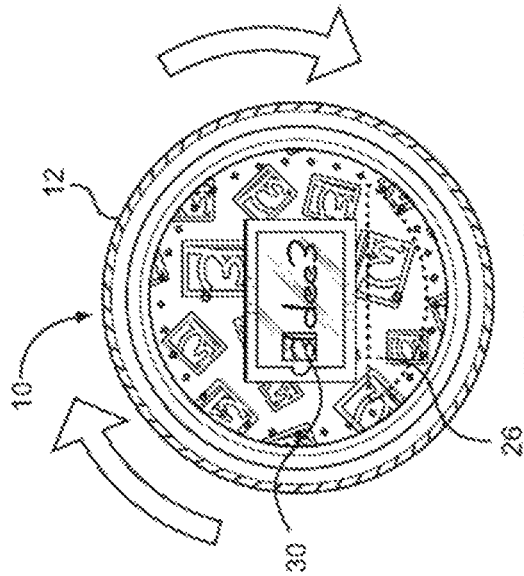
FIG. 3B shows a side view of one embodiment of the present invention shown in use.
Figure 3B:
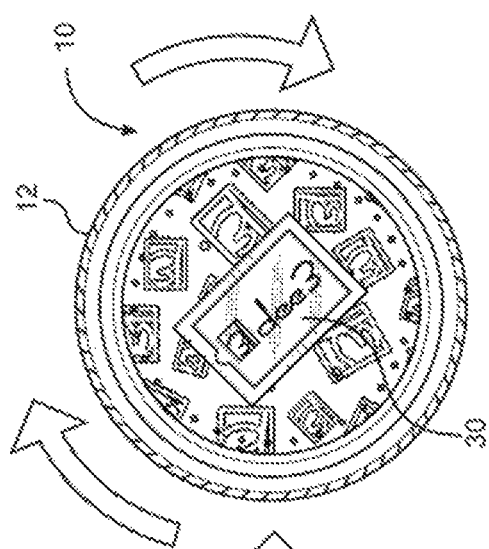
Figure 3A:
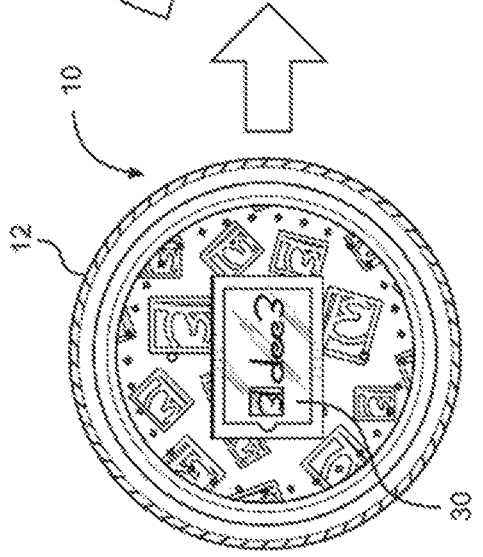
FIG. 3A shows a side view of one embodiment of the present invention shown in use.
Figure 4:
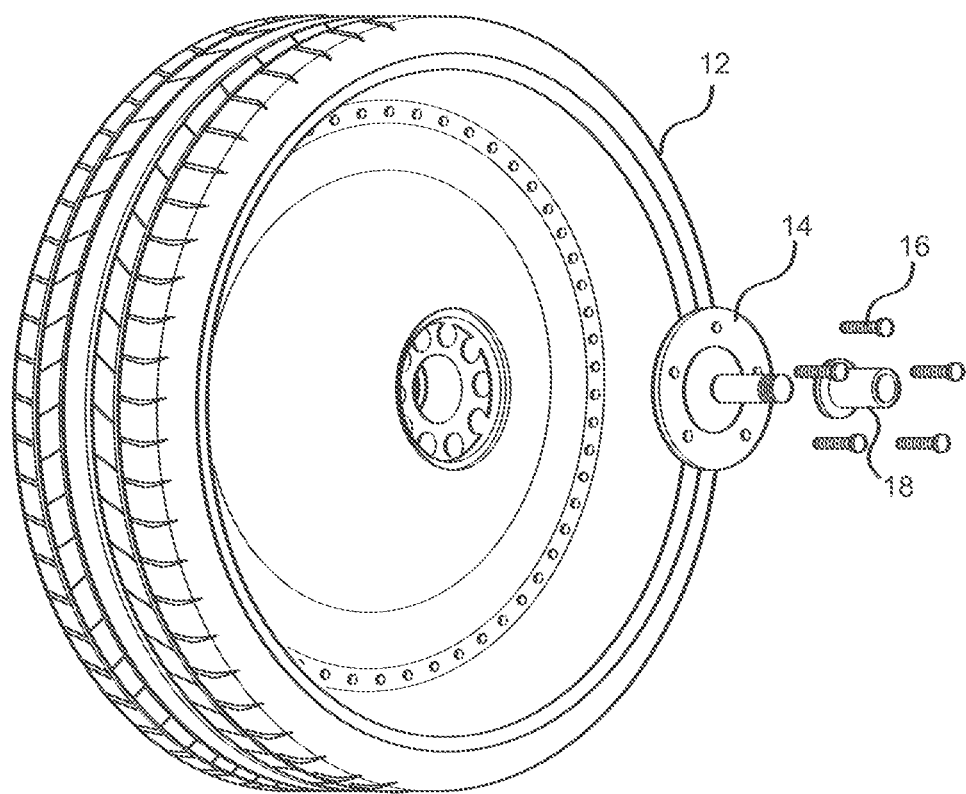
FIG. 4 shows an enlarged exploded view of one embodiment of the present invention shown in use.
Figure 5:
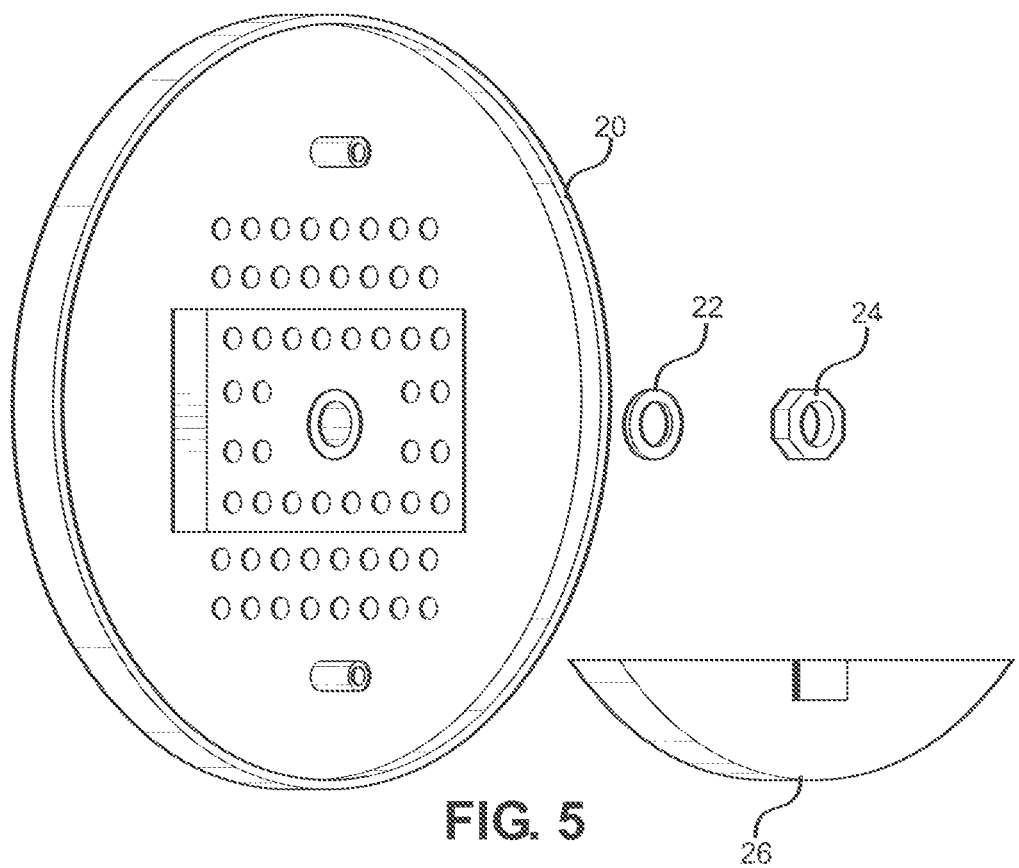
FIG. 5 shows an enlarged exploded view of one embodiment of the present invention shown in use.
Figure 6:
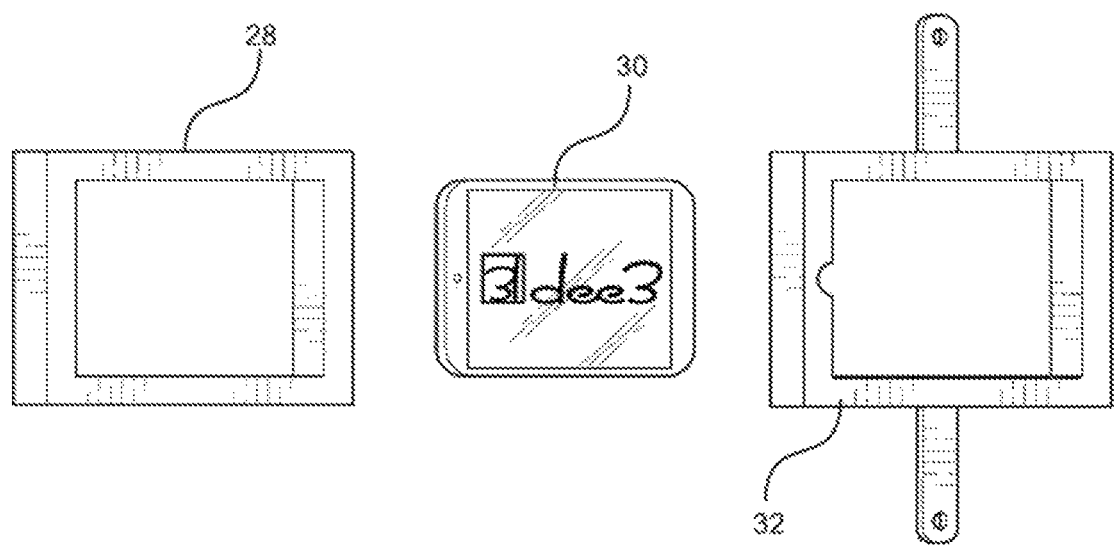
FIG. 6 shows an enlarged exploded view of one embodiment of the present invention shown in use.
Figure 7:
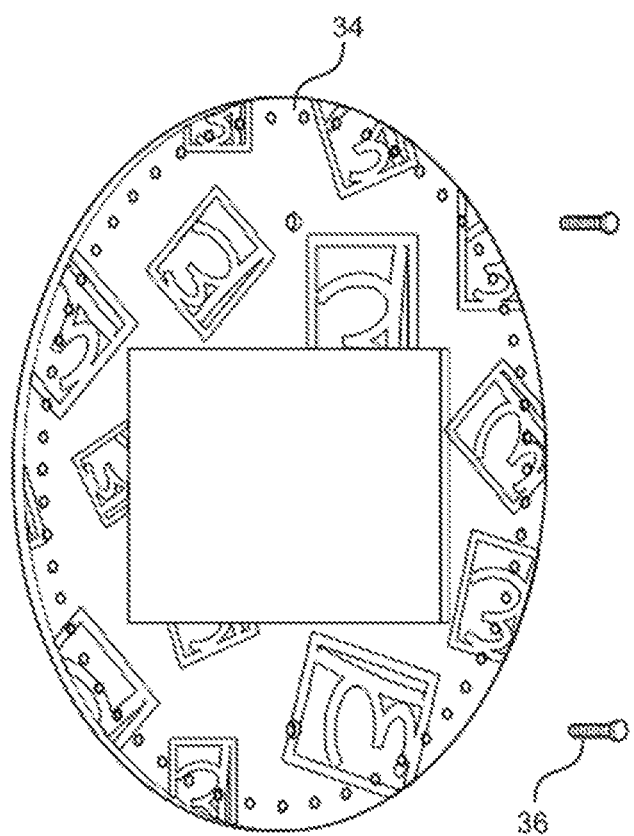
FIG. 7 shows an enlarged exploded view of one embodiment of the present invention shown in use.

By way of example, and referring to FIG. 1-7, a wheel assembly 10 is configured to display digital information. The wheel assembly 10 has a wheel 12, joined to a spinner base 20 with a spinner hub 14. The spinner hub 14 is fixed to the wheel 12 with at least five hub screws 16. The spinner hub 14 is partially covered with a sleeve 18 that is immediately adjacent to the spinner base 20 such that the sleeve 18 rotates independently of the spinner hub 14. The spinner hub 14 can be joined to the spinner base 20 with a washer 22 and a nut 24.

A weight 26 is joined to a spinner base lower portion. A spacer 28 is joined to the spinner base 20 above the weight 26. A bracket 32 is joined to the spinner base 20 and is arranged against the spacer 28. A mobile device 30 is housed within the bracket 32. A cover plate 34 is joined to the spinner base 20, and further comprises a central opening that surrounds the bracket 32. In some embodiments, a pair of screws 36 join the cover plate 34 and the bracket 32 to the spinner base 20.

As the wheel 12 rotates, the weight 26 causes the spinner base 20 to rotate opposite the wheel 12 thus maintaining the mobile device 30 in a stable position so that the mobile device 30 displays the digital information.

The wheel 12 is preferably up to sixty inches in diameter. The spinner base 20 can be made from metal or plastic preferably up to 60 inches in diameter. The spinner base can be joined to the spinner hub 14 with five 6 mm hub bolts, spacer, sleeve, bearing, washer, assembly nut, bearing cover with two lock screws. The spinner base 20 includes rubber insulation, at least one mobile device and metal bracket preferably up to 60 inches, attached with two lock nuts. The front cover can be metal or plastic preferably up to 60 inches in diameter and includes two lock screws.

The graphic design on the cover plate 34 is determined by, for example, the color(s) used in the graphic, the sizes of the graphic (or its components), the positions of the graphic (or its components), the movements of the graphic (or its components), the geometrical shapes of the graphic (or its components), the number of colors in the graphic, the variations of the color combinations in the graphic, the number of graphics printed, the disappearance of color(s) in the graphic, and the contents of text messages in the graphic.

In some embodiments, the graphic design includes a Quick Response Code, matrix code, two-dimensional bar code, optical machine-readable labels, or other readable code. In some embodiments, the spatially raised features comprise an attention pattern with a plurality of raised truncated domes or cones. In some embodiments, the raised truncated domes or cones are circular. In some embodiments, the truncated domes or cones are arranged in an array. In some embodiments, the spatially raised features comprise a guiding pattern with a plurality of raised bars. In some embodiments, the raised bars are parallel flat-topped elongated bars or sinusoidal ribs. In some embodiments, the raised bars are arranged in an array. In some embodiments, the graphic design is selected from the group consisting of a logo, slogan, lettering, pictures, names, product illustrations, emblems, promotional information related to a product or service, directions and symbols.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A wheel assembly, configured to display graphic designs and digital information; the wheel assembly comprising:
   a wheel, joined to a spinner hub with a spinner base;
   a weight, joined to a spinner base lower portion;
   a spacer joined to the spinner base above the weight;
   a bracket, joined to the spinner base and arranged against the spacer;
   a mobile device housed within the bracket;
   a cover plate, joined to the spinner base, and further comprising a central opening that surrounds the bracket,
   graphic designs, arranged on the cover plate and terminating at the bracket;
   wherein as the wheel rotates, the weight causes the spinner base to rotate opposite the wheel thus maintaining the mobile device in a stationary position so that the mobile device displays the digital information.

2. The wheel assembly of claim 1, wherein the spinner hub is fixed to the wheel with at least five hub screws.

3. The wheel assembly of claim 2, wherein the spinner hub is partially covered with a sleeve immediately adjacent to the spinner base such that the sleeve rotates independently of the spinner hub.

4. The wheel assembly of claim 3, further comprising a pair of screws joining the cover plate and the bracket to the spinner base.

5. The wheel assembly of claim 1, wherein the graphic design is at least one member selected from a group consisting of a logo, a slogan, lettering, pictures, names, product illustrations, emblems, promotional information related to a product or service, directions and symbols.

* * * * *